Figure 1:
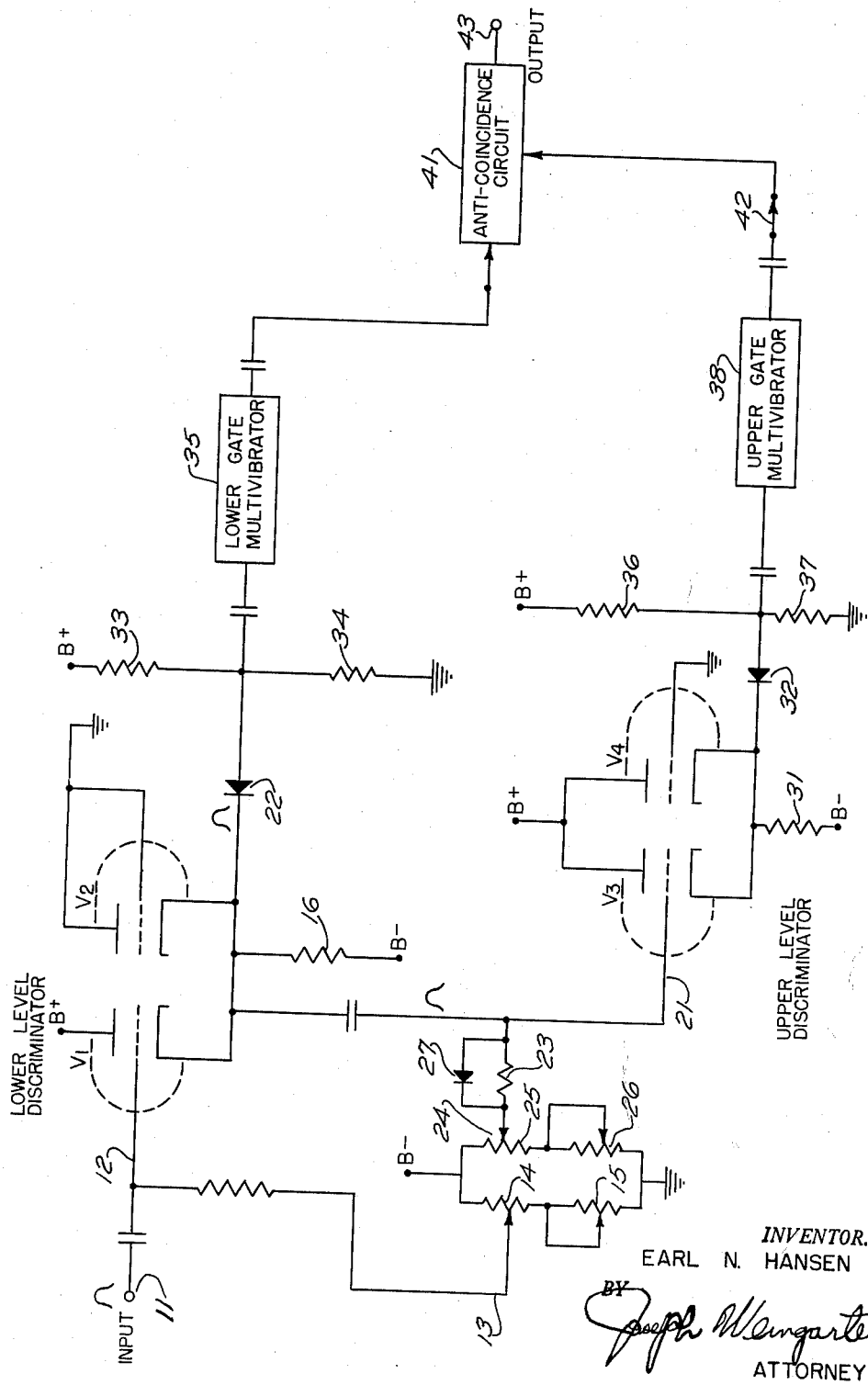

June 11, 1963

E. N. HANSEN 3,093,799

SIGNAL ANALYZING CIRCUIT

Filed July 20, 1959

2 Sheets-Sheet 1

INVENTOR.
EARL N. HANSEN
BY
Joseph Weingarten
ATTORNEY

United States Patent Office 3,093,799
Patented June 11, 1963

3,093,799
SIGNAL ANALYZING CIRCUIT
Earl N. Hansen, Melrose, Mass., assignor, by mesne assignments, to Laboratory For Electronics, Inc., Boston, Mass., a corporation of Delaware
Filed July 20, 1959, Ser. No. 828,403
3 Claims. (Cl. 328—115)

This invention relates in general to apparatus for investigating the characteristics of electrical pulse trains and more particularly to an economical and efficient pulse height analyzer.

Electrical pulse height analyzers are well known in the art. The function of the analyzer is to select and count pulses of a particular amplitude range which occur in a sequence of pulses of varying amplitudes. These devices have been particularly useful in radioactivity measurements in both the medical and industrial fields. In these measurements the pulse height spectrum which may be obtained by virtue of a pulse height analyzer is indicative of the energy of the radioactive particle and hence, in many cases, of the particular radioisotope employed. For some applications it is desirable to measure the entire pulse height spectrum in a differential manner, whereas in others it is rather the object to measure the variations in number of pulses over a particular portion of the spectrum as a function of time. In general, two types of analyzers have been used in these measurements, single channel and multi-channel devices. In the latter the entire spectrum is observed at once by classifying each pulse which comes into the analyzer into its proper height category. In the former, single channel method, only one category of pulses is examined at a time. Thus in this case pulses whose amplitude exceeds a set lower boundary, yet do not exceed a set upper boundary, are counted. If it is desired to obtain measurements over the entire spectrum using a single channel analyzer, the two boundaries which form a "window" are moved systematically over the entire range of pulse amplitudes, generally preserving the "window" width, that is, maintaining the lower and upper boundaries in a fixed relationship to one another. The single channel analyzer is of course well suited to measurements of the type where only a particular portion of the spectrum is being analyzed as a function of time. Here the lower and upper boundary levels are set a distance apart corresponding to the width of the spectrum which it is desired to measure and the arrival of pulses whose amplitude lies within these boundaries is recorded as a function of time.

From the above discussion it becomes apparent that an absolute prerequisite of a single channel analyzer is very high stability of both the lower and upper boundary levels since, if these were to vary while measuring a portion of a spectrum in which the number of pulses varied sharply with pulse height, variations of the boundary levels would create apparent variations in the number of pulses within that particular portion of the spectrum. In a practical case, for example, the width between the lower and upper boundary levels might be 1 volt in amplitude and the window might be located by virtue of the lower boundary level at an amplitude of 40 volts. In this case the lower boundary level would essentially be fixed at 40 volts and the upper boundary level at 41 volts, but a 1 volt variation in the upper level would double the width of the window. Perhaps an even more rigorous requirement is that this window width remain fixed while scanning the lower level boundary over amplitudes which may range from 1 to 100 volts.

In the past the instruments developed to provide single channel analysis have generally operated on the basis of a parallel input, that is, the input pulses were fed simultaneously into two gating circuits, one biased to the desired low level boundary while the other was biased to the desired upper level boundary. The outputs of these two gates were then coupled to an anti-coincidence gate circuit which provided an output only if the lower boundary gate output was not coincident with an output from the upper boundary gate. Differential scanning with such a system requires a floating bias arrangement whereby the lower level boundary may be moved over the entire range of amplitude and the upper boundary will remain a fixed amplitude above it. This arrangement requires an isolated bias supply referenced to the bias level of the lower boundary gate. Still other problems inherent in such a system arise from the fact that both large and small pulses are required to activate the same gate and yet overloading characteristics of the gate output would seriously distort the anti-coincidence gate operation.

It is therefore a primary object of the current invention to provide a stable, efficient, single channel spectrometer circuit capable of operating over a wide range of pulse heights.

It is another object of the current invention to provide a stable pulse height discrimination circuit which does not require highly regulated filament supplies.

It is still another object of the present invention to provide an efficient, stable single channel spectrometer which does not require an isolated bias supply.

Broadly speaking the present invention operates by providing two discriminator circuits capable of operating in series such that the output of the first discriminator circuit is only that part of the original pulse which exceeded the lower level boundary and hence the second discriminator circuit, into which this pulse is fed, need only determine whether this pulse exceeds an amplitude which has been set as the window width. The discriminator circuits employed incorporate a non-overloading feature such that multi-vibrator circuits connected to trigger on the outputs from each discriminator do not receive pulses of amplitude greater than a certain amount, and since the output of these multi-vibrators is fed to the anti-coincidence circuit, the anti-coincidence circuit only receives undistorted multi-vibrator pulses. Since the upper level boundary gate is operative only on that portion of the pulse which passed the lower level boundary gate it, as well as the lower level boundary, can be biased with respect to ground and there is no need to change this bias as the lower level discriminator is scanned over a series of pulse amplitudes. This type of operation is allowable because the discriminator circuits employed provide an output pulse whose amplitude is linearly dependent upon the amplitude excess of the input pulse over the input bias.

Figure 2:
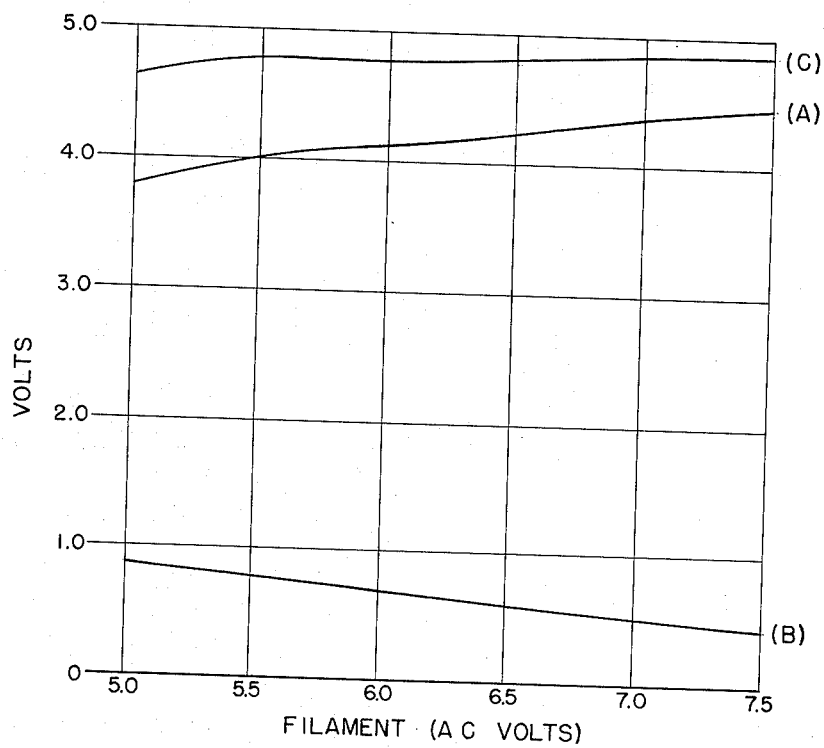

Other objects and advantages will be more fully understood from the following description when taken in conjunction with the accompanying drawing in which:

FIG. 1 is an illustration partly in schematic and partly in block diagrammatic form of a preferred embodiment of this invention; and FIG. 2 is a graphical representation of current characteristics helpful to an understanding of this invention.

With reference now specifically to the schematic portions of FIG. 1, the lower level discriminator is seen to include triode $V_1$ and diode connected triode $V_2$. The input 11 to the circuit is capacitively coupled to control grid 12 of tube $V_1$. This control grid is also resistively coupled to movable center tap 13 of potentiometer 14, which is coupled in series with potentiometer 15 between ground and a negative voltage supply. The position of movable arm 13 on potentiometer 14 determines the negative bias supplied to control grid 12 and the purpose of potentiometer 15 is to provide a lower limit on the amount of bias which may be applied to this grid. The cathodes of both tubes $V_1$ and $V_2$ are connected together and coupled to negative voltage supply through resistor 16. These cathodes are also capacitively coupled to control grid 21 of tube $V_3$ as well as being directly coupled to the cathode of diode 22. Control grid 21 of the triode $V_3$ is resistively coupled through resistor 23 to movable center tap 24 of potentiometer 25 which is connected in series with potentiometer 26 between ground and the negative voltage supply. Diode 27 which conducts positive current in the direction of control grid 21 is coupled directly across resistor 23. Tube $V_4$ is a triode with a grounded control grid and its cathode is connected to the cathode of tube $V_3$, both cathodes being coupled through resistor 31 to the negative voltage supply. The plates of tubes $V_3$ and $V_4$ are connected to the positive voltage supply. The cathodes are also coupled directly to the cathode of diode 32.

Resistors 33 and 34 are serially connected between the positive voltage supply and ground and resistor 34 is generally small compared to the value of resistor 33. The junction of resistors 33 and 34 is connected directly to the anode of diode 22 and is capacitively coupled to lower gate multi-vibrator 35. In like fashion resistors 36 and 37 are serially connected between the positive voltage supply and ground and their junction is directly connected to the cathode of diode 32 and capacitively coupled to upper gate multi-vibrator 38. The output of lower gate multi-vibrator 35 is capacitively coupled to anti-coincidence circuit 41, while the output of upper gate multi-vibrator 38 is capacitively coupled through single pole-double throw switch 42 to a separate input of anti-coincidence circuit 41. Anti-coincidence circuit 41 may be any conventional inhibited gate circuit which operates so that a pulse from multi-vibrator 35 will provide an output pulse on the anti-coincidence output 43 unless there is a time coincidence between a pulse from multi-vibrator 38 with the pulse from multi-vibrator 35.

Having described the nature and connection of the key circuit elements, its operation will now be explained. The amplitude level at which the lower level discriminator is set is controlled by the position of movable center tap 13 on potentiometer 14 which controls the amount of negative bias applied to control grid 12 of tube $V_1$. Tube $V_1$ is connected essentially as a cathode follower with a "breakaway" cathode feature provided by the diode action of tube $V_2$. Thus when there is no pulse on the input, control grid 12 is biased below cutoff and the cathodes of tubes $V_1$ and $V_2$ assume some negative potential with respect to ground. In this condition tube $V_2$ connected to the diode is rendered highly conducting and presents a very low impedance. This low impedance combined with the stray capacitance at control grid 12 would generally provide a rather short time constant and thus inhibit capacitive coupling through the discriminator stage of pulses which do not exceed the bias level. On the other hand, when a positive pulse appears at the input 11 of an amplitude in excess of the negative bias applied to control grid 12, tube $V_1$ is rendered conductive and the cathodes of $V_1$ and $V_2$ become positive with respect to ground. When this condition occurs, diode $V_2$ stops conducting and presents a very high impedance to ground and, provided that cathode resistor 16 is selected to be a value somewhat less than this open resistance of diode $V_2$, resistor 16 becomes the controlling cathode resistor. The action of tubes $V_1$ and $V_2$ in this condition now provides the customary cathode follower action and the cathode pulse bears a linear relationship to that portion of the input pulse which exceeds the negative bias at control grid 12. This cathode pulse is capacitively coupled to control grid 21 of tube $V_3$ in the upper level discriminator and also to the cathode of crystal diode 22. If now the action of that portion of the circuit involving resistors 33 and 34 as well as diode 22 is considered, it will be seen that initially, when the cathodes of $V_1$ and $V_2$ are negative with respect to ground and $V_2$ is highly conductive, the cathode of diode 22 is at a negative voltage with respect to ground. Diode 22 is then conducting and of low impedance and the serial combination of the low impedance of diode 22 and diode $V_2$ provides a low impedance path to ground from the junction of resistors 33 and 34. If resistor 34 is selected to be a relatively high impedance compared to the diode impedances, most of the current through resistor 33 will be diverted through the diode combinations rather than through resistor 34. However, when the positive pulse at the input 11 causes the cathode to assume a positive potential diode 22 is rendered non-conducting and presents a high impedance path to ground, hence most of the current through resistor 33 is now flowing through resistor 34 to ground, thereby raising the potential at the junction between resistors 33 and 34. The maximum potential which this junction can attain is however limited to that represented by the entire current through resistor 33 times the value of resistor 34 and hence the pulse coupled to lower gate multi-vibrator 35 has a limit on its maximum amplitude.

As previously indicated, multi-vibrator 35 may be of conventional design providing a fixed duration constant amplitude output pulse in response to an input pulse which exceeds its trigger level. In general multi-vibrator 35 would have a relatively low trigger level in the order of a few tenths of a volt. If a pulse output is provided from multi-vibrator 35, anti-coincidence circuit 41 will also provide an output unless it is inhibited at the input by a pulse from upper gate multi-vibrator 38.

Returning now to the lower level discriminator circuit output, which occurs when the pulse at its input exceeds the bias set for the lower level, this cathode pulse is also coupled capacitively to control grid 21 of tube $V_3$. Control grid 21 has negative bias applied to it through resistor 23 and potentiometers 25 and 26 and this bias may be adjusted by adjusting the position of movable center tap 24 on potentiometer 25. This adjustment in fact constitutes setting the window width, that is, the amplitude range above the lower level within which pulses will be accepted. This bias then forms the upper limit of this window width and pulses whose amplitude in excess of the lower level exceeds this bias will provide an output from the upper level discriminator which will inhibit the action of anti-coincidence circuit 41 in responding to the pulse from the lower level discriminator. It is of course necessary that the level of this upper discriminator must remain extremely stable, since small changes in its level directly vary the window width and when scanning or counting in a fixed position on a rapidly varying spectrum, a small change in window width can cause a drastic variation in counting rate of pulses. Diode 27 which is coupled across resistor 23 in the bias system of the upper level discriminator provides a leakage path so that a fast pulse rate from the low level discriminator will not operate to change the effective bias of the upper level discriminator. The upper level discriminator again operates on the "breakaway" cathode principle. However, in this case the tube $V_4$, which provides the low impedance path when tube $V_3$ is not conducting, is connected as a grounded grid triode. The reason for this will be explained in more detail below. Following the upper level discriminator is an amplitude limiting circuit which operates exactly as does that following the lower level discriminator. Upper gate multi-vibrator 38 again may be of any conventional design providing a single pulse in response to a pulse at its input exceeding its trigger level. Two position switch 42 would normally be kept closed for operation as a single channel analyzer; however, its purpose is to provide that the entire instrument may be used as a single level discriminator with an essentially open window, when it is desired.

Referring to FIG. 1 it will be noted that the diode breakaway circuit in the lower level discriminator is shown as a vacuum tube diode. This is preferred from the standpoint of the stability requirement of the discriminator. The cathode follower $V_1$ is a filament operated tube and, as the filament varies, the grid to cathode bias will also vary. If a crystal diode were to be used as the cathode breakaway, the firing level of this discriminator would depend upon the filament voltage, and hence filament variation would result in variations in this level. If however a vacuum tube diode is used, the filaments, being connected to a common supply, will both vary at the same time and the effect on the diode conductance is very nearly the same as the effect on the cathode follower and further is in the direction to cancel it out. Thus referring to FIG. 2, curve A is a plot of filament voltage as a function of grid to cathode bias for a cathode follower, while curve B is a plot of filament voltage as a function of plate to cathode potential of a vacuum tube connected as a diode. Curve C of FIG. 2 shows a plot of the variation in the sum of these two voltages which would be added in a circuit connected as are $V_1$ and $V_2$ in the lower level discriminator. In the upper level discriminator, however, a grounded grid triode is employed rather than a diode. This could have been done in the lower level discriminator; however, any variation in trigger level of the upper level discriminator is more critical than that in the lower since it directly reflects in the window width. The use of a grounded grid triode provides that both tubes $V_3$ and $V_4$ are operating on the same characteristics with regard to filament voltage and hence the effects of variations in filaments of the two tubes will exactly cancel each other out.

While many tubes may be satisfactory for use as $V_1$, $V_2$, $V_3$ and $V_4$ in this circuit, curves A and B were measured on a Type 5965 tube. Tube types 5963 and 12AT7 are also suitable for this purpose. The table below gives the component values for a typical circuit embodiment.

|  | Thousand ohms |
|---|---|
| Resistor 16 | 27 |
| Potentiometer 14 | 50 |
| Potentiometer 15 | 10 |
| Potentiometer 25 | 50 |
| Potentiometer 26 | 10 |
| Resistor 23 | 150 |
| Resistor 31 | 27 |
| Resistor 33 | 270 |
| Resistor 34 | 4.7 |
| Resistor 36 | 270 |
| Resistor 37 | 4.7 |
| Rectifiers 22 and 32 (type 1N628 crystal diodes). | |

While the above circuit has been operated with these values of components as described in the table, it is obvious that the concepts disclosed herein are not limited to any particular component values, but rather may be instrumented with other component values and pulse characteristics. Therefore, since numerous modifications and departures may now be made by those skilled in the art, the invention described herein is to be construed as limited only by the spirit and scope of the appended claims.

What is claimed is:

1. A pulse amplitude selector circuit comprising first and second discriminator stages, said first stage providing in response to a pulse at its input a pulse at its output only if said input pulse exceeds a first predetermined amplitude level, said output pulse from said first stage having an amplitude related to the difference between said input pulse amplitude and said predetermined amplitude level, said second stage having as its input the said output of said first stage, said second stage providing an output pulse only if said output pulse from said first stage exceeds a second predetermined amplitude level, an anticoincidence output circuit coupled to said first and said second discriminator stage outputs and adapted to provide a circuit output only when said first discriminator stage output pulse does not coincide with a pulse from said second discriminator stage output, whereby an output pulse is provided in response only to output pulses from said first discriminator stage which have an amplitude less than said second predetermined amplitude level, wherein said first and second discriminator stages each comprise first and second electron tubes, each said first electron tube being operated as a cathode follower, each said second electron tube being connected as a triode having its control grid connected directly to a respective reference potential junction, and each having its cathode coupled directly to the cathode of the respective discriminator first tube, a source of negative potential resistively coupled to said cathodes of said first and said second tubes in each of said stages, whereby a pulse at the input of each of said first tubes, which does not exceed the respective predetermined amplitude level is capacitively coupled to the respective output of each of said stages with a time constant determined by the conductance of the respective second electron tube, whereas a pulse at the input of each of said first tubes which exceeds the respective predetermined amplitude level renders the respective first tube conducting thereby substantially decreasing the conductance of the respective second electron tube.

2. A pulse amplitude selector circuit as described in claim 1 wherein each of said first and second discriminator stages include a non-overload output circuit comprising a crystal diode having an anode terminal and a cathode terminal, said cathode terminal of said diode being coupled directly to the respective second tube cathode, first and second resistors connected in series between a source of positive potential and said potential reference point, said anode terminal of said crystal diode being connected directly to the junction between said first and second resistors, whereby the potential appearing on said resistor junction in response to changes of potential upon the respective first and second tube cathodes is limited by the conducting characteristics of said crystal diodes.

3. A pulse amplitude selector circuit comprising first and second discriminator stages, said first stage providing in response to a pulse at its input a pulse at its output only if said input pulse exceeds a first predetermined amplitude level, said output pulse from said first stage having an amplitude related to the difference between said input pulse amplitude and said predetermined amplitude level, said second stage having as its input the said output of said first stage, said second stage providing an output pulse only if said output pulse from said first stage exceeds a second predetermined amplitude level, an anticoincidence output circuit coupled to said first and said second discriminator stage outputs and adapted to provide a circuit output only when said first discriminator stage output pulse does not coincide with a pulse from said second discriminator stage output, whereby an output pulse is provided in response only to output pulses from said first discriminator stage which have an amplitude less than said second predetermined amplitude level, wherein said first discriminator stage comprises first and second electron tubes, said first electron tube being connected as a cathode follower circuit, said second electron tube being connected as a diode, the cathode of said second tube being coupled directly to the cathode of said first tube, said second discriminator stage having first and second electron tubes, said second stage first electron tube being connected as a cathode follower circuit, said second stage second electron tube being connected as a triode having its control grid connected to a reference potential junction, the cathodes of said second discriminator stage first and second tubes being connected directly together.

References Cited in the file of this patent

UNITED STATES PATENTS

| 2,419,548 | Grieg | Apr. 29, 1947 |
| 2,694,146 | Fainstein | Nov. 9, 1954 |
| 2,760,064 | Bell | Aug. 21, 1956 |